United States Patent [19]  [11] 4,130,674
Roberts et al.  [45] Dec. 19, 1978

[54] PROCESS OF CONTROLLING ORGANIC COATINGS IN AQUEOUS SPRAY BOOTH SYSTEMS

[75] Inventors: Wilbert J. Roberts, Plymouth; Gerald R. Weissman, Southfield, both of Mich.

[73] Assignee: Detrex Chemical Industries, Inc., Detroit, Mich.

[21] Appl. No.: 825,328

[22] Filed: Aug. 17, 1977

[51] Int. Cl.$^2$ .......................... B05D 1/40; B05D 1/02
[52] U.S. Cl. ........................................ 427/331; 134/38; 210/52; 210/54; 252/180; 252/181; 252/DIG. 8; 427/345; 427/421
[58] Field of Search ...................... 427/421, 345, 331; 252/180, 181, DIG. 8; 134/38; 55/85, 89; 210/52, 54 A

[56] References Cited

U.S. PATENT DOCUMENTS

| | | | |
|---|---|---|---|
| 2,750,343 | 6/1956 | Beber | 252/DIG. 8 X |
| 2,982,723 | 5/1961 | Arnold et al. | 252/DIG. 8 X |
| 3,173,879 | 3/1965 | Arnold et al. | 252/364 |
| 3,251,882 | 5/1966 | Kirkpatrick et al. | 260/584 |
| 3,475,202 | 10/1969 | Bok | 427/345 |
| 3,515,575 | 6/1970 | Arnold | 210/54 A |
| 3,806,460 | 4/1974 | Makai et al. | 252/DIG. 8 |
| 3,861,887 | 1/1975 | Forney | 55/85 X |
| 3,985,922 | 10/1976 | Thornton | 427/345 |
| 3,990,986 | 11/1976 | Gabe et al. | 252/DIG. 8 X |
| 4,055,404 | 10/1977 | Daimer | 252/DIG. 8 |
| 4,055,495 | 10/1977 | Gabel et al. | 210/52 |
| 4,058,458 | 11/1977 | Svarz | 210/52 |
| 4,067,806 | 1/1978 | Mauceri | 55/89 X |

FOREIGN PATENT DOCUMENTS 828778  2/1960  United Kingdom ..................... 427/345

*Primary Examiner*—Shrive P. Beck
*Attorney, Agent, or Firm*—Paul & Paul

[57] ABSTRACT

A process is described wherein oversprayed organic coatings are controlled in an aqueous spray booth system by adding to the water spray supply an effective amount of a mixture of (1) a long chain surface active nitrogen derivative and (2) at least one member selected from the class of polyvalent water soluble or dispersible metal salts, nonionic high molecular weight polymers, anionic high molecular weight polymers, or a blend of nonionic and anionic high molecular weight polymers. The mixture is added to the water in the proportions of from about 0.05% by weight to 2% by weight of the solution. The method, which works with solvent-borne coatings and water-borne coatings results in rendering the organic coatings non-sticky, non-tacky and separable as a readily handled sludge.

10 Claims, No Drawings

PROCESS OF CONTROLLING ORGANIC COATINGS IN AQUEOUS SPRAY BOOTH SYSTEMS

BRIEF SUMMARY OF THE INVENTION

In the spray application of paints, lacquers and other organic finishes, it is necessary to trap the oversprayed coating materials in some way to avoid their building up on the walls and exhaust system surfaces of the spray booth. In many large industrial installations this is accomplished by the use of water curtains whereby the oversprayed coating material is trapped in water which cascades down the walls of the booth and lies underneath it. However, the accumulation of raw coating material in the water supply of these installations results in serious problems, such as, blockage of the pipes and pumps which circulate the water and a build-up of paint on the walls of the booth underneath the water curtain. Furthermore, the accumulation of raw paint in the bottom of the water reservoir creates a serious problem when the system is periodically cleaned out, much effort being required to remove the heavy build-up coating material on the bottom of the reservoir.

It is, therefore, desirable to treat the water in the booth in such a way as to render the oversprayed coating material free of stickiness and tackiness so that it will readily separate itself from the water, not adhere to the curtain walls, pipes and pumps, and remain in a loose granular condition at the bottom of the water reservoir so that it can be readily removed by flushing.

It is an object of this invention to provide a means of preventing the adhesion of oversprayed coating material to the side walls, pumps and piping of water-washed spray booths.

It is another object of this invention to provide a means of treating the oversprayed coating material which accumulates in the water reservoir of a water-washed spray booth so that it forms a loose, particulate non-cohesive sludge which can be removed without the necessity of chopping and scraping and by simple water flushing.

It is a further object of this invention to condition the oversprayed coating material in a water-washed spray booth so that it can be readily separated from the water in the reservoir so that the water can then be returned to the system for re-use.

In accordance with this invention, oversprayed coating materials are rendered particulate and free of stickiness and tackiness by adding to the water in the spray booth a solution of (1) a long carbon chain surface active nitrogen derivative with inorganic metal salts, or (2) a blend of nonionic high molecular weight polymer and a long chain surface-active nitrogen derivative or (3) a blend of anionic high molecular weight polymer and a long chain surface active nitrogen derivative, or (4) a blend of these anionic and nonionic polymer and a long chain surface active nitrogen derivative.

The inorganic salts referred to are chosen from a group of polyvalent water soluble or dispersible salts such as the nitrates, sulfates, chlorides, bromides, iodides or acetates of magnesium, calcium, strontium, barium, iron, zinc and aluminum. The nonionic and anionic polymers are represented by homopolymers, copolymers and terpolymers of acrylic acid, acrylamide, acrylonitrile, polyhydroxy alcohols, polyamines, polytetraethylenediamine, vegetable gums, polyisocyanates, polyglycidyls, various polyaldehydes and formaldehydes. The surface-active nitrogen materials represent a group of nitrogen derivatives containing one or more hydrocarbon chains of about $C_8$ to $C_{18}$ length.

In practice, a solution containing the aforementioned materials is added to water in the spray booth so that the spray booth water contains from about 0.05% to about 2% of the solution. The pH of the system is then adjusted by the use of an acid, for example, hydrochloric, nitric, sulfuric, acetic acid or a base, for example, sodium or potassium hydroxide or an alkaline carbonate to a level optimum for the particular paint being sprayed into the booth. This will fall between a pH of about 7.5 and 11.0 for solvent-borne coatings and a pH of about 5.5 and 7.5 for water-borne coatings.

When such additions are made to the water contained in the spray booth system, the oversprayed paint is rendered particulate, non-sticky and non-tacky, and does not adhere to the spray booth walls, bottom pipes and pumps.

An automotive spray booth system will use between 10,000 to 500,000 gallons of water on a continuous basis. The aerospace industry uses large hanger-type buildings, also involving between 10,000 to 200,000 gallons of water. Both industries require clean water, allowing them to re-use this solution on a continuous basis. Dumping these quantities, due to paint build-up, would represent a serious pollution problem.

The subject of this invention represents a unique approach to this problem through the use of long chain surface-active nitrogen derivatives in combination with certain alternative additives.

DETAILED DESCRIPTION

In the normal operation of a water-washed or water-curtain spray booth, the mist of oversprayed coating material is removed from the air in the booth by contacting the air with a curtain of water cascading down the walls. Normally this water is recirculated over the walls from a reservoir of water underneath the booth or in close proximity to it by means of pumps which are capable of moving a large flow of water through large diameter pipes. As more and more coating material is sprayed in the booth, the material removed from the air builds up in the water in the form of a tar-like coherent sludge which in a short time can foul the pumps and lines which circulate the booth's water. Furthermore, this sludge is extremely difficult to remove from the pump, lines and reservoir.

In the past it has frequently been the custom to add to the spray booth water strongly alkaline compounds to produce a less coherent sludge. These materials performed in a reasonably satisfactory manner on coating materials in use at that time, for example, alkyd or nitrocellulose base paints. More recently social, economic and technical changes have required newer, more efficient, paint systems capable of meeting the federal emission regulations, OSHA and EPA standards. These newer type coating systems, for example, non-aqueous dispersion (NAD) types do not respond favorably to the strong caustic type products and require newer systems specifically designed for these coating materials and compliance with the same governmental emission regulations. The subject of this invention represents a unique approach to this problem through the use of long chain surface-active nitrogen derivatives.

Furthermore, the long carbon chain surface-active nitrogen derivatives, when used as described, do not produce foam normally associated with surface-active chemicals. This unique advantage allows use of these surface-active materials in spray booth systems, as compared to high foaming materials such as alkylarylethylene oxide condensates or sodium alkylarylsulfonates. The tendency of these surface-active materials to produce foam prevent their use in this application.

The long carbon chain surface-active nitrogen derivatives are used in combination with either polyvalent metal salts or high molecular weight polymers of the nonionic and anionic types or mixtures thereof. The polyvalent metal salts are represented by water soluble or dispersible salts of calcium, iron, zinc, barium, magnesium, strontium and aluminum, such as the chlorides, sulfates, acetates, citrates, oxalates, bromides, or iodides; e.g., zinc nitrate, ferric chloride, magnesium acetate, barium nitrate, aluminum sulfate and zinc chloride. Other polyvalent metal salts, such as, cobalt, nickel, chrome, titanium, copper, and vanadium, are useful but are economically impractical, and in some areas, they are considered pollutants and generally harmful to the environment.

The nonionic and anionic polymers are represented by homopolymers, copolymers, and terpolymers of acrylic acid, acrylamide, acrylonitrile, polyhydroxy alcohols, polyamines, polytetraethylenediamine, vegetable gums, polyisocyanates, polyglycidyl, various aldehydes and formaldehyde.

Typical nonionic-anionic polymers are condensates of acrylonitrile, acrylamide and acrylic acid.

Although the polyvalent metals, or nonionic-anionic polymers, have been considered adequate when used alone, the combination of polyvalent metal salts and long carbon chain surface-active nitrogen derivatives, or nonionic-anionic polymers and long chain surface-active nitrogen derivatives are significantly better and represent new art to this industry. By being able to combine all three materials in one system, a broad spectrum capability of converting a wide variety of paints to ecologically harmless sand-like waste is created thereby ensuring clear water suitable for recycling in the spray booth system. The organic coatings handled by this system include NAD (automotive) primes, acrylic NAD (automotive) topcoats, alkyd primers, polyester topcoats, acrylic lacquers, epoxy primes, water-borne alkyl topcoats, latex based topcoats and melamine alkyd topcoats.

The use of long carbon chain surface-active nitrogen derivatives in combination with commercially available polyvalent metal salts and nonionic-anionic polymers allows the automotive, appliance and aerospace industries to use a wide variety of new generation paints without polluting the environment or resorting to high energy consuming waste disposal techniques. The subject of this invention represents a practical approach to reducing environmental pollution from a wide variety of organic coatings at very low energy levels, through the use of long chain surface-active nitrogen derivatives.

The most effective composition ranges for the active ingredients used in the process of this invention are as follows:

|  | Percent by weight of solution |
|---|---|
| Aluminum chloride | 1 – 10 |
| Ferric chloride | 5 – 25 |
| Water | q.s. to 100 |
| Polymer | 0.05 – 5 |

-continued

|  | Percent by weight of solution |
|---|---|
| L.C.S.A. nitrogen derivative | 0.05 – 5 |

Preferred composition range for the active ingredients used in the process of this invention are as follows:

|  | Percent by weight of solution |
|---|---|
| Aluminum chloride | 2 – 4 |
| Ferric chloride | 7 – 11 |
| Water | q.s. to 100 |
| Polymer | 0.05 – 1.5 |
| L.C.S.A. nitrogen derivative | 0.1 – 0.3 |

The following examples are conducted by first making a test solution of the following composition: (Exs. 23, 25 and 31 are comparative examples)

|  | Percent by weight of solution |
|---|---|
| Aluminum chloride | 3.0 |
| Ferric chloride | 9.0 |
| Water | 86.2 |
| Polymer | 1.5 |
| L.C.S.A. nitrogen derivative | 0.3 |

The chemical identity of long chain surface active (L.C.S.A.) nitrogen derivative and the polymer is taken from the table of examples. 750ml of tap water at a temperature of between 10° C. and 20° C. is placed in a Waring blender. 1.5 ml of the test solution (0.2% v/v) is added to the water and the blender is started. With the blender running, the pH is adjusted to the desired valve. With the blender still running, 4.0 ml of paint is dripped into the liquid. Following addition of the paint, the blender is allowed to run for 30 seconds, then shut off. The condition of the suspended material is observed after three minutes to determine the clarity of the mother liquor, the lack of cohesion of the separated material, and the freedom from tackiness and stickiness of the separated paint. Throughout the examples, the same test paint was used: i.e., an automotive primer of the non-aqueous dispersion (NAD) type. Since the process of this invention operates with at least equal efficiency on many different types of surface coating material, there is no known type of paint which would limit the effectiveness of the process. Similarly, although a limited number of examples of combinations of polymers and L.C.S.A. nitrogen derivatives is disclosed, these combinations are not by way of limitation of the scope of the process of this invention. This method of testing, i.e., using a Waring blender to evaluate the system for converted organic coating, tendency to foam, water clarity, etc., shows excellent agreement with field operations in automotive spray booth systems of 10,000 to 200,000 gallons of water.

| Ex. No. | Surface Active Agent | Polymer |
|---|---|---|
| 1 | Dimethyldicocoammonium chloride | Non-ionic polyacrylamide, mol. wt. ≅ 1,000,000 |
| 2 | Dimethylditallowammonium chloride | " |
| 3 | Ethyleneoxide condensate of N-Tallowamine | " |
| 4 | Ethyleneoxide condensate of N-Cocoamine oxide | " |
| 5 | Ethyleneoxide condensate of N-Tallowamine oxide | " |

-continued

| Ex. No. | Surface Active Agent | Polymer |
|---|---|---|
| 6 | Trimethylcocoammonium chloride | " |
| 7 | N-ditallowamine acetate salt | " |
| 8 | Ethylene oxide condensate of N-Cocoamine | 41 |
| 9 | Cocoimidazolinium quaternary salt | " |
| 10 | Trimethylstearylammonium chloride | " |
| 11 | Substituted imidozoline amphoteric | " |
| 12 | N-Cocamine acetate salt | " |
| 13 | Cocoamido sulfobetaine | " |
| 14 | Dimethyldodecylamine | " |
| 15 | Alkyl substituted oxazaline | " |
| 16 | Alkyl substituted oxazaline | " |
| 17 | N-Cocopolyethoxylated quaternary ammonium | " |
| 18 | N-Octadecylpolyethoxylated quaternary ammonium salt | " |
| 19 | N-Coco Morpholine Oxide | " |
| 20 | Ethylene diamine propylene oxide condensates | " |
| 21 | N-Cocosulfobetaine | " |
| 22 | Ethylene diamine propylene oxide condensates | " |
| 23 | Sodium salt of dodecylbenzene sulfonate | " |
| 24 | Ethylene diamine propylene oxide condensates | " |
| 25 | Nonylphenolethylene oxide condensate | " |
| 26 | Alkylimidazolinium quaternary salt | " |
| 27 | N-Cetyl amino betaine | " |
| 28 | N-(B-hydroxyethyl) rosin amines | " |
| 29 | Oleic acid imidazoline quaternary salt | " |
| 30 | N-cocoamido sulfobetaine | " |
| 31 | Free acid of complex organic phosphate ester | " |
| 32 | Long chain alkanolamide | " |
| 33 | Sodium salt of 2-Caprylic imidazoline | " |
| 34 | N-stearylamine betaine | " |
| 35 | Alkylimidazolinium quaternary salt | " |
| 36 | Dodecylimidazolinium quaternary salt | " |
| 37 | Myristylimidazolinium quaternary salt | " |
| 38 | 2-Undecylimidazoline | " |
| 39 | Ethylene oxide condensate of cocoamine oxide | " |
| 40 | Ethylene oxide condensate of cocoamine oxide | Anionic polyacrylamide |
| 41 | " | Non-ionic polyacrylamide |
| 42 | " | " |
| 43 | Ethoxylated octadecyl quaternary ammonium salt | " |
| 44 | " | Anionic polyacrylamide |
| 45 | " | Non-ionic polyacrylamide |
| 46 | " | polyacrylamide |
| 46 | " | " |
| 47 |  |  |
| 48 | N,N-ethoxylated oleic acid amide | " |
| 49 | Ethoxylated (bio-2 hydroxyethyl) coco quaternary ammonium salt | " |
| 50 | Ethoxylated (bio-2 hydroxyethyl) tallow quaternary ammonium salt | " |
| 51 | Soybean oil long chain amine | " |
| 52 | Polyhexafluoropropylene amphoteric | " |
| 53 | Polyhexafluoropropylene cationic | " |
| 54 | N-Coco-beta-aminobutyric acid | " |
| 55 | N,N-ethoxylated hydrogerated tallow amide | " |
| 56 | Ethoxylated N-tallow trimethylenediamine | " |
| 57 | Sodium salt of N-lauryl-B-iminodipropionic acid | " |
| 58 | Disodium N-tallow-B-iminodipropionate | " |
| 59 | Trimethyl tallow ammonium chloride | " |
| 60 | N-alkyl dimethylbenzyl ammonium chloride | " |

Similar tests are conducted using the long chain surface-active nitrogen derivatives with inorganic salts, but omitting the high molecular weight polymer from the concentrate. The composition ranges of the concentrated active material used in this work are as follows:

|  | Percent by weight of solution |
|---|---|
| Aluminum chloride | 1 — 10% |
| Ferric chloride | 5 — 25% |
| L.C.S.A. nitrogen derivative | 0.05 — 10% |
| Water | q.s. — 100% |

Preferred composition ranges of this embodiment of the process of this invention are as follows:

|  | Percent by weight of solution |
|---|---|
| Aluminum chloride | 2 — 6% |
| Ferric chloride | 7 — 14% |
| L.C.S.A. nitrogen derivative | 0.1 — 1.0% |
| Water | q.s. — 100% |

Similar tests are also conducted using the long chain surface-active nitrogen derivative with high molecular weight polymer, but omitting the inorganic salts from the concentrate. The composition ranges of this embodiment of the process of this invention are as follows:

|  | Percent by weight of solution |
|---|---|
| Polymer | 0.05 — 10% |
| L.C.S.A. nitrogen derivative | 0.1 — 10% |
| Water | q.s. — 100% |

Preferred composition ranges of this embodiment of the process of this invention are as follows:

|  | Percent by weight of solution |
|---|---|
| Polymer | 0.1 — 5.0% |
| L.C.S.A. nitrogen derivative | 0.5 — 5.0% |
| Water | q.s. — 100% |

The necessary effective amount of a two-component composition using either long chain surface-active nitrogen derivative plus high molecular weight polymer or long chain surface-active nitrogen derivative plus inorganic salts was higher, over a wide variety of paints, as compared to the three-component composition using long chain surface-active nitrogen derivative, high molecular weight polymer and inorganic salts.

The relative range of effective amounts for two-component and three-component compositions are:

| Concentrate | Concentration |
|---|---|
| Three component | 0.2 — 0.5% v/v |
| Two component | 0.4 — 0.8% v/v |

The best performance, recorded over a wide variety of paints, utilized the combination of inorganic salts, high molecular weight polymer and long chain surface active nitrogen derivatives.

Test results indicate that a composition using the inorganic salts or high molecular weight polymer alone is satisfactory over a wide variety of paints, at significantly higher effective amount in the order of from about 2-5% v/v.

The inclusion of various long chain surface active nitrogen derivatives to either inorganic salts or high molecular weight polymers significantly improves its effectiveness over a wide variety of paints at lower effective amounts. The inclusion of surface active materials, other than long chain surface active nitrogen derivatives, to either inorganic salts or high molecular weight polymer decreased their effectiveness as a paint deflocculant, creating excessive foam, and actually dispersing the paint and increasing its adherence to the spray booth walls, etc. These comparative materials are shown in examples 23, 25 and 31. A commercial application of this invention is shown in the following example:

EXAMPLE 61

In an automobile body spray booth, the water reservoir, which contains 200,000 gallons of water, was charged with 400 gallons of a concentrate containing 80 lbs. of aluminum chloride, 360 lbs. of ferric chloride, 20 lbs. of nonionic polyacrylamide polymer, 10 lbs. of a long-chain nitrogen derivative and 350 gallons of water. The pH was then adjusted to 9.5 by addition of caustic soda. The oversprayed paint, which consisted of a thermo setting acrylic automotive enamel, was trapped by the water in the system and was converted into a sandlike sludge which floated on top of the reservoir and was easily removed by skimming.

Having thus described our invention, we claim:

1. In a process for controlling the overspray of organic coatings in an aqueous spray booth system, the improvement which comprises the step of adding to the water supply of an aqueous spray booth system adapted to remove the overspray of organic coatings, an effective amount of a mixture of (1) a long carbon chain surface active nitrogen derivative containing one or more hydrocarbon chains of about $C_8$ to $C_{18}$ in length and (2) at least one member selected from the class consisting of (a) a polyvalent water soluble or dispersible metal salt of a metal selected from the class consisting of calcium, iron, zinc, barium, magnesium, strontium and aluminum, and (b) a nonionic or anionic high molecular weight polymer selected from the class consisting of homopolymers, copolymers or terpolymers of acrylic acid, acrylamide, acrylonitrile, polyhydroxyalcohols, polyamines, polytetraethylenediamine, vegetable gums, polyisocyanates, polyglycidyl and aldehydes, or a blend of said polymers, whereby any organic coating over-sprayed into said water supply becomes removable therefrom as a non-sticky, non-tacky, readily handled sludge.

2. The process of claim 1 wherein the mixture added to the water supply constitutes from about 0.05 percent by weight to about two percent by weight of the water supply and the pH of the water supply is adjusted to within the range of from about pH 7.5 to pH 11.0.

3. The process of claim 1 wherein the mixture added to the water supply constitutes from about 0.05 percent by weight to about two percent by weight of the water supply and the pH of the water supply is adjusted to within the range of from about pH 5.5 to pH 7.5.

4. The process of claim 1 wherein the mixture includes a long chain surface active nitrogen derivative, a polyvalent water soluble or dispersible metal salt and a nonionic high molecular weight polymer.

5. The process of claim 1 wherein the mixture includes a long chain surface active nitrogen derivative, a polyvalent water soluble or dispersible metal salt and an anionic high molecular weight polymer.

6. The process of claim 1 wherein the mixture includes a long chain surface active nitrogen derivative, a polyvalent water soluble or dispersible metal salt and a blend of nonionic and aninonic high molecular weight polymers.

7. The process of claim 1 wherein the mixture includes a major amount of polyvalent water soluble or water dispersible metal salt and a minor amount of a long chain surface active nitrogen derivative.

8. The process of claim 1 wherein the mixture includes a long chain surface active nitrogen derivative and a nonionic high molecular weight polymer.

9. The process of claim 1 wherein the mixture includes a long chain surface active nitrogen derivative and anionic high molecular weight polymer.

10. The process of claim 1 wherein the mixture includes a long chain surface active nitrogen derivative and a blend of nonionic and anionic high molecular weight polymers.

* * * * *